US006164055A

United States Patent [19]

Lovett et al.

[11] Patent Number: 6,164,055

[45] **Date of Patent: *Dec. 26, 2000**

[54] DYNAMICALLY UNCOUPLED LOW NOX COMBUSTOR WITH AXIAL FUEL STAGING IN PREMIXERS

[75] Inventors: Jeffery Allan Lovett, Scotia; Steven George Goebel, Clifton Park, both of N.Y.

[73] Assignee: General Electric Company, Schenectady, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 09/248,749

[22] Filed: Feb. 12, 1999

Related U.S. Application Data

[63] Continuation of application No. 08/812,894, Mar. 10, 1997, Pat. No. 5,943,866, which is a continuation-in-part of application No. 08/316,967, Oct. 3, 1994, abandoned, and a continuation-in-part of application No. 08/553,908, Nov. 6, 1995, abandoned.

[51] Int. Cl.[7] ........ F02C 7/228

[52] U.S. Cl. ........ 60/39.06; 60/737; 60/725; 431/114

[58] Field of Search ........ 60/39.06, 737, 60/738, 748, 742, 725, 747; 431/114

[56] References Cited

U.S. PATENT DOCUMENTS

| | | | |
|---|---|---|---|
| H1008 | 1/1992 | Schadow et al. | 60/737 |
| 2,573,536 | 10/1951 | Bodine, Jr. . | |
| 2,796,734 | 6/1957 | Bodine , Jr. . | |
| 3,034,299 | 5/1962 | Hammett . | |
| 4,175,380 | 11/1979 | Baycura . | |
| 4,265,615 | 5/1981 | Lohmann et al. . | |
| 4,409,787 | 10/1983 | Davi et al. . | |
| 4,455,840 | 6/1984 | Matt et al. | 60/737 |
| 4,589,260 | 5/1986 | Krockow | 60/737 |
| 4,761,958 | 8/1988 | Hellat . | |
| 4,926,645 | 5/1990 | Iwai et al. | 60/723 |
| 5,000,004 | 3/1991 | Yamanaka et al. | 60/723 |
| 5,101,633 | 4/1992 | Keller et al. | 60/737 |
| 5,165,241 | 11/1992 | Joshi et al. . | |
| 5,193,346 | 3/1993 | Kuwata et al. | 60/737 |
| 5,211,004 | 5/1993 | Black . | |
| 5,218,824 | 6/1993 | Cedersall et al. . | |
| 5,244,380 | 9/1993 | Dobbeling et al. . | |
| 5,259,184 | 11/1993 | Borkowicz et al. | 60/39.55 |
| 5,345,768 | 9/1994 | Washam et al. | 60/737 |
| 5,351,477 | 10/1994 | Joshi et al. | 60/39.463 |
| 5,359,847 | 11/1994 | Pillsbury et al. | 60/748 |
| 5,361,586 | 11/1994 | McWhirter et al. | 60/737 |
| 5,408,830 | 4/1995 | Lovett | 60/737 |
| 5,487,274 | 1/1996 | Gulati et al. | 70/725 |
| 5,551,228 | 9/1996 | Mick et al. | 60/39.06 |
| 5,644,918 | 7/1997 | Gulati et al. | 60/725 |
| 5,660,045 | 8/1997 | Ito et al. | 60/747 |
| 5,667,376 | 9/1997 | Robertson et al. | 431/115 |
| 5,676,538 | 10/1997 | Lovett | 431/182 |
| 5,699,667 | 12/1997 | Joos | 60/737 |
| 5,722,230 | 3/1998 | Cohen et al. | 60/39.37 |
| 5,729,968 | 3/1998 | Cohen et al. | 60/39.06 |

FOREIGN PATENT DOCUMENTS

| | | |
|---|---|---|
| 0358437 | 3/1990 | European Pat. Off. . |
| 597722 | 1/1984 | Japan . |
| 2288010 | 10/1995 | United Kingdom . |
| 2288011 | 10/1995 | United Kingdom . |

*Primary Examiner*—Ted Kim

*Attorney, Agent, or Firm*—Patrick K. Patnode; Marvin Snyder

[57] ABSTRACT

A low NOx combustor and method improve dynamic stability of a combustion flame fed by a fuel and air mixture. The combustor includes a chamber having a dome at one end thereof to which are joined a plurality of premixers. Each premixer includes a duct with a swirler therein for swirling air, and a plurality of fuel injectors for injecting fuel into the swirled air for flow into the combustion chamber to generate a combustion flame therein. The fuel injectors are axially staged at different axial distances from the dome to uncouple the fuel from combustion to reduce dynamic pressure amplitude of the combustion flame.

1 Claim, 2 Drawing Sheets

DYNAMICALLY UNCOUPLED LOW NOX COMBUSTOR WITH AXIAL FUEL STAGING IN PREMIXERS

CROSS REFERENCE TO RELATED APPLICATIONS

This application is a continuation of Ser. No. 08/812,894, filed Mar. 10, 1997, now U.S. Pat. No. 5,943,866, which is hereby incorporated by reference in its entirety, which is in turn a continuation in part of commonly assigned patent application Ser. No. 08/316,967, filed Oct. 3, 1994, entitled “Dynamically-Stable Premixer for Low NOx Combustors” now abandoned and Ser. No. 08/553,908, filed Nov. 6, 1995 entitled “Dynamically Uncoupled Low NOx Combustor,” now abandoned each of which is herein incorporated by reference.

BACKGROUND OF THE INVENTION

The present invention relates generally to gas turbine engines, and, more specifically, to low NOx combustors therein.

Industrial, power generation gas turbine engines include a compressor for compressing air that is mixed with fuel and ignited in a combustor for generating combustion gases. The combustion gases flow to a turbine that extracts energy therefrom for driving a shaft to power the compressor and producing output power for typically powering an electrical generator for example. The engine is typically operated for extended periods of time at a relatively high base load for powering the generator to produce electrical power to a utility grid for example. Exhaust emissions from the combustion gases are therefore a concern and are subject to mandated limits.

More specifically, industrial gas turbine engines typically include a combustor designed for low exhaust emissions operation, and in particular for low NOx operation. Low NOx combustors are typically in the form of a plurality of burner cans circumferentially adjoining each other around the circumference of the engine, with each burner can having a plurality of premixers joined to the upstream ends thereof. Each premixer typically includes a cylindrical duct in which is coaxially disposed a tubular centerbody extending from the duct inlet to the duct outlet where it joins a larger dome defining the upstream end of the burner can and combustion chamber therein.

A swirler having a plurality of circumferentially spaced apart vanes is disposed at the duct inlet for swirling compressed air received from the engine compressor. Disposed downstream of the swirler are suitable fuel injectors typically in the form of a row of circumferentially spaced-apart fuel spokes, each having a plurality of radially spaced apart fuel injection orifices which conventionally receive fuel, such as gaseous methane, through the centerbody for discharge into the premixer duct upstream of the combustor dome.

The fuel injectors are disposed axially upstream from the combustion chamber so that the fuel and air has sufficient time to mix and pre-vaporize. In this way, the premixed and pre-vaporized fuel and air mixture support cleaner combustion thereof in the combustion chamber for reducing exhaust emissions. The combustion chamber is typically imperforate to maximize the amount of air reaching the premixer and therefore producing lower quantities of NOx emissions. The resulting combustor is thereby able to meet mandated exhaust emission limits.

Lean-premixed low NOx combustors are more susceptible to combustion instability in the combustion chamber as represented by dynamic pressure oscillations of the combustion flame, which if suitably excited can cause undesirably large acoustic noise and accelerated high cycle fatigue damage to the combustor. The flame pressure oscillations can occur at various fundamental or predominant resonant frequencies and higher order harmonics thereof. The flame pressure oscillations propagate upstream from the combustion chamber into each of the premixers and in turn cause the fuel and air mixture generated therein to oscillate or fluctuate.

For example, at a specific flame pressure oscillation frequency, the pressure adjacent to the fuel injection orifices varies between high and low values which in turn causes the fuel being discharged therefrom to vary in flowrate from high to low values so that the resulting fuel and air mixture defines a fluctuating fuel and air concentration wave which then flows downstream into the combustion chamber wherein it is ignited and releases heat during the combustion process. If this heat release from the fuel concentration wave matches in phase the corresponding flame pressure oscillation frequency, excitation thereof will occur causing the pressure magnitude to increase in resonance and create undesirably high acoustic noise and high cycle fatigue damage.

In the parent applications identified above, combustion dynamic stability is enhanced by mis-matching the phase of the heat release from the fuel concentration wave with the phase of the flame pressure oscillation (that is, the high fuel concentration should be 180° out-of-phase with the high pressure oscillation) at one or more specific frequencies to uncouple the cooperation therebetween and attenuate the flame pressure oscillation thereby. The present invention provides further improvements in dynamically uncoupling the fuel from the combustion flame pressure oscillation for reducing combustor instabilities.

SUMMARY OF THE INVENTION

A low NOx combustor and method improve dynamic stability of a combustion flame fed by a fuel and air mixture. The combustor includes a chamber having a dome at one end to which is joined a plurality of premixers. Each premixer includes a duct with a swirler therein for swirling air, and a plurality of fuel injectors for injecting fuel into the swirled air for flow into the combustion chamber to generate a combustion flame therein. The fuel injectors are axially staged at different axial distances from the dome to uncouple the fuel from combustion to reduce dynamic pressure amplitude of the combustion flame.

DETAILED DESCRIPTION OF THE INVENTION

Figure 1:
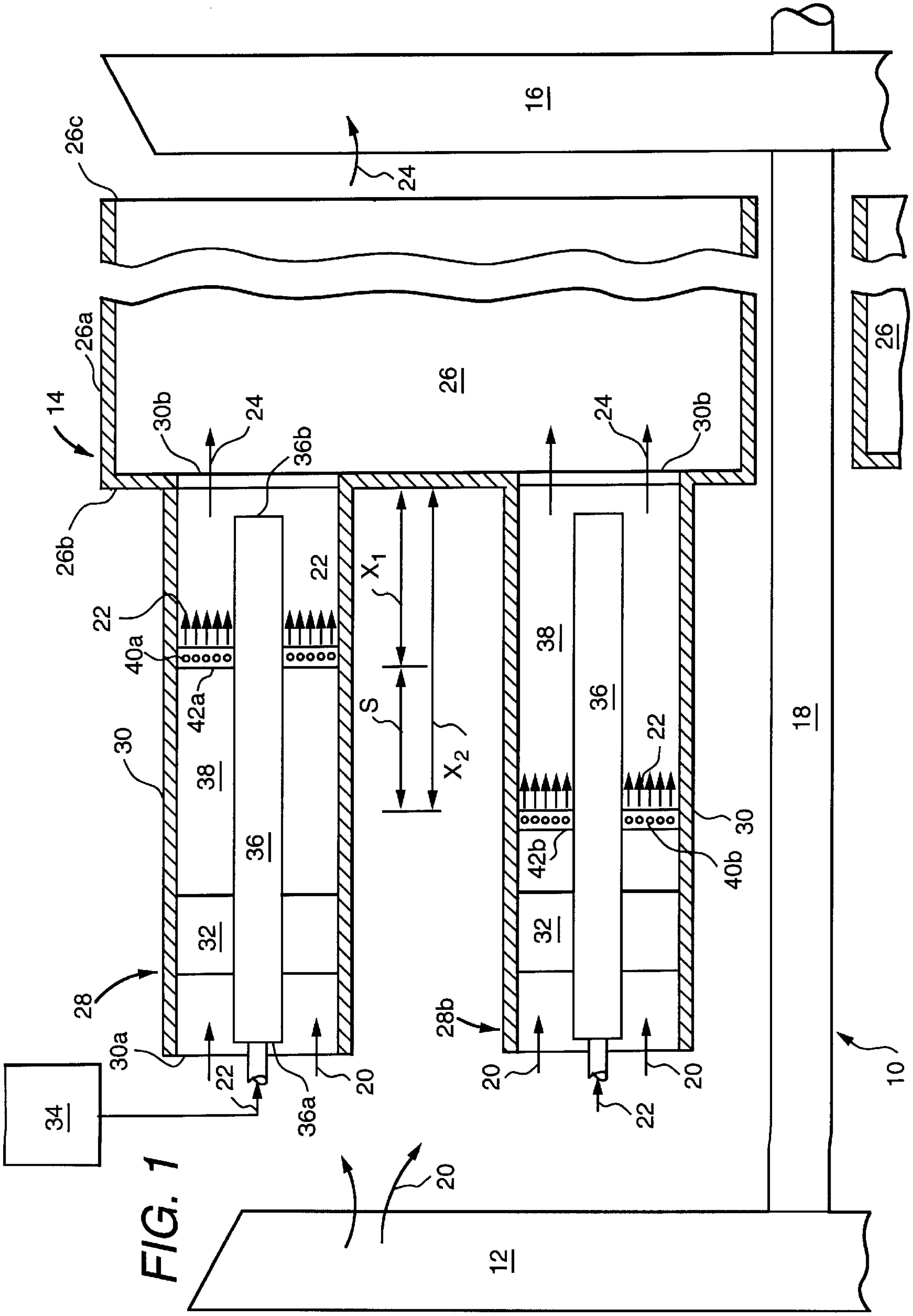
FIG. 1 is a schematic representation of a portion of an industrial gas turbine engine having a low NOx combustor in accordance with one embodiment of the present invention joined in flow communication with a compressor and turbine.

An industrial turbine engine 10 includes a multi-stage axial compressor 12 disposed in serial flow communication with a low NOx combustor 14 and a single or multi-stage turbine 16, as shown in FIG. 1. Turbine 16 is coupled to compressor 12 by a drive shaft 18, a portion of which drive shaft 18 extends therefrom for powering an electrical generator (not shown) for generating electrical power. During operation compressor 12 discharges compressed air 20 into combustor 14 wherein compressed air 20 is mixed with fuel 22 and ignited for generating combustion gases or flame 24 from which energy is extracted by turbine 16 for rotating shaft 18 to power compressor 12, as well as producing output power for driving the generator or other suitable external load.

In this exemplary embodiment, combustor 14 includes a plurality of circumferentially adjoining burner cans or combustion chambers 26, each defined by a tubular combustion liner 26*a* which is preferably imperforate to maximize the amount of air reaching the premixer for reducing NOx emissions. Each combustion chamber 26 further includes a generally flat dome 26*b* at an upstream end, and an outlet 26*c* at a downstream end. A conventional transition piece (not shown) joins the several can outlets to effect a common annular discharge to turbine 16.

Coupled to each combustor dome 26*b* is a plurality of premixers identified by the prefix 28, which may number four or five, for example. Since premixers 28 are preferably identical to each other except as indicated below, common reference numerals will be used for identical components thereof. Each premixer 28 includes a tubular duct 30 having an inlet 30*a* at an upstream end thereof for receiving compressed air 20 from compressor 12, and an outlet 30*b* at an opposite, downstream end suitably disposed in flow communication with combustion chamber 26 through a corresponding hole in dome 26*b*. Dome 26*b* is typically larger in radial extent than the collective radial extent of the several premixers 28 which allows premixers 28 to discharge into the larger volume defined by combustion chamber 26. Furthermore, dome 26*b* provides a bluff body which acts as a flameholder from which combustion flame 24 extends downstream therefrom during operation.

Each of premixers 28 preferably includes a conventional swirler 32 which includes a plurality of circumferentially spaced apart vanes disposed in duct 30 adjacent to duct inlet 30*a* for swirling compressed air 20 channeled therethrough in a conventional fashion. A fuel injector 34 is provided for injecting fuel 22, such as natural gas, into the several ducts 30 for mixing with swirled air 20 in ducts 30 for flow into combustion chamber 26 to generate combustion flame 24 at duct outlets 30*b*.

In the exemplary embodiment illustrated in FIG. 1, each of premixers 28 further includes an elongate centerbody 36 disposed coaxially in duct 30, and having an upstream end 36*a* at duct inlet 30*a* joined to and extending through the center of swirler 32, and a bluff or flat downstream end 36*b* disposed at duct outlet 30*b*. Centerbody 36 is spaced radially inward from duct 30 to define a cylindrical flow channel 38 therebetween.

Fuel injector 34 typically includes conventional components such as a fuel reservoir, conduits, valves, and any required pumps for channeling fuel 22 into the several centerbodies 36. In the exemplary embodiment wherein fuel 22 is a gaseous fuel such as natural gas, only fuel 22 need be channeled into centerbodies 36 without any additional pressurized atomizing air.

In accordance with one embodiment of the present invention, fuel injector 34 further includes a plurality of fuel injection orifices designated by the prefix 40 axially spaced apart from each other between dome 26*b* and swirlers 32. Fuel injection orifices 40 inject fuel 22 at different axial staging distances such as $X_1$ and $X_2$, measured upstream from dome 26*b* from which flame 24 extends downstream, to uncouple the fuel from the combustion to reduce dynamic pressure amplitude of flame 24 during operation, as disclosed in greater detail below.

As indicated above, low NOx combustors having premixers effect a combustion flame 24 that typically has dynamic pressure fluctuations or oscillations during operation. Combustion flame 24 is a fluid which undergoes pressure oscillation at various frequencies, which typically include a fundamental resonant frequency and harmonics thereof.

In order to maintain suitable dynamic stability of combustor 14 during operation, the various frequencies of pressure oscillation should remain at relatively low pressure amplitudes to avoid resonance at unsuitably large pressure amplitudes leading to combustor instability expressed in a high level of acoustic noise or high cycle fatigue damage, or both. Combustor stability is conventionally effected by adding damping using a perforated combustion liner for absorbing the acoustic energy. However, this method is undesirable in a low emissions combustor since the perforations channel film cooling air which locally quench the combustion gases increasing CO levels and it is preferable to maximize the amount of air reaching the premixer for reduced NOx emissions.

In another conventional arrangement, the heat release of the fuel and air mixture discharged into the combustion chamber may be axially spread out for de-coupling the heat release from pressure antinodes within the combustion chamber. However this solution is mechanically more difficult to construct.

In accordance with the present invention, axially staging the fuel and air mixtures in premixers 28 is effected to uncouple the heat release from the combustion fuel and air mixtures from the combustion flame pressure oscillations in combustion chamber 26. Dynamic uncoupling by axial fuel staging may be better understood by understanding the apparent theory of operation of combustor dynamics. During operation, fuel 22 and air 20 are premixed in premixers 28 to form a fuel-air mixture which is discharged through each of duct outlets 30*b* into the common combustion chamber 26. The initial fuel-air mixture is conventionally ignited to establish combustion flame 24 which thereafter continually ignites the entering fuel-air mixture. Combustion flame 24 is excitable at various pressure oscillation frequencies including the fundamental acoustic frequency. For example, the fundamental acoustic frequency may be 50 Hertz (Hz) with higher order harmonics at 100 Hz and 150 Hz.

Any specific pressure oscillation frequency may propagate upstream into each of premixers 30 at a velocity generally equal to the speed of sound minus the average flow velocity of the air flow, or fuel-air mixture flow, through flow channels 38. When the flame pressure oscillation reaches fuel injection orifices 40 after an upstream time delay, the pressure oscillations interact therewith for varying or fluctuating the amount of fuel discharged. Accordingly, the fuel-air mixture developed downstream from orifices 40 behaves as an oscillation at the corresponding flame pressure oscillation frequency effecting a fuel concentration wave. The wave travels downstream from orifices 40 and reaches combustion flame 24 at dome 26*b* after another time delay caused by traveling at the average velocity of the airflow or wave through flow channel 38. The wave then undergoes combustion which adds an additional time delay of about 0.1 to about 1 millisecond (ms) before heat is released therefrom.

The total time delay relative to combustion chamber 26 may be readily calculated in components by first dividing the corresponding axial distance such as $X_1$ by the difference in the speed of sound minus the average velocity of the forward flow through flow channel 38 for the upstream propagation of the flame pressure oscillation. Secondly, the same distance $X_1$ is divided by the average flow velocity for the downstream propagation of the fuel concentration wave. And, finally a time delay is added for chemically releasing heat from the combusting fuel-air mixture.

With the time delay then being known, the specific axial distance $X_1$ may be selected to ensure that the heat release from the fuel concentration wave in combustion chamber 26 is out of phase with the pressure oscillation of flame 24 at a specific frequency for attenuating pressure amplitude of flame 24 at that frequency. For example, the period of oscillation for a frequency of 50 Hz is the reciprocal thereof which is equal to 20 ms. And for a specific average flow velocity through flow channels 38, the collective time delay upstream from flame 24 to orifices 40 and back, and including the heat release delay may be readily calculated to determine the required distance $X_1$ having a half period of about 10 ms for ensuring 180° out of phase between the heat release from the fuel concentration wave and the flame pressure oscillation.

It should be recognized, however, that the residence or convection time of the fuel concentration wave in premixer 28 should be suitably long for obtaining effecting premixing and pre-vaporization for obtaining low NOx combustion, but should not be too long which would heat the fuel and air mixture to an auto ignition temperature which could promote undesirable flashback of flame 24 inside premixer ducts 30. Flashback is of course undesirable since it can damage premixer 30, with both combustor dome **26*b* and centerbody downstream ends 36*b* being bluff for ensuring flameholding capability and properly anchoring flame 24 during operation. Accordingly, the specific axial distance of fuel injection orifices 40 is so limited for ensuring suitable flashback margin during operation, with orifices 40 preferably being located downstream of swirlers 32 for minimizing the overall length of ducts 30 and also ensuring that swirlers 32** do not themselves form an obstruction having flameholding capability.

The optimum premixer configuration is dependent upon the specific conditions for a given combustor. Thus, a mathematical model is used to determine the resulting phase relationship between the combustion chamber pressure and the fuel concentration wave arriving at the flame front. The fluctuating pressure P' at the flame front is assumed to be a sine wave, so $$P' = P_c \sin(\omega t)$$

where $P_C$ is the dynamics amplitude. Assuming fuel injection orifices 40 are located at a distance $x_f$ from the flame front, then the pressure wave arriving at orifices 40 is delayed with respect to the chamber pressure by a time $x_f/(c-V)$ where c is the speed of sound and V is the air flow velocity in premixer 28. Similarly, the pressure wave arriving at swirler 32 is delayed with respect to the chamber pressure by a time $x_a/(c-V)$ where $x_a$ is the distance the swirler is located from the flame front.

The mass flow rates through fuel injection orifices 40 and swirler 32 ($m_f$ and $m_a$, respectively) are calculated according to the orifice equation so that $$\dot{m}f = A_{ef}\sqrt{\frac{2g}{RT_f}P_{sf}(P_{sf} - P_{ave} - P')}$$

and $$\dot{m}_a = A_{ea}\sqrt{\frac{2g}{RT_a}P_{sa}(P_{sa} - P_{ve} - P')}\,.$$

where Aef is the effective area of the fuel injection orifices 40, Aea is the effective area of swirler 32, $P_{sf}$ is the supply pressure at fuel injection orifices 40, $P_{sa}$ is the supply pressure at swirler 32 and $P_{ave}$ is the average pressure in the combustor. The fuel wave so generated then arrives at the flame front after a further delay of $x_f/V$ due to flow convection through premixer 28. Likewise, the air flow can be described as a wave produced by swirler 32 and arriving at the flame front after a further delay of $x_a/V$. Thus, the fuel flow arrives at the flame front after a total time delay of $$\tau_f = \frac{x_f}{c-V} + \frac{x_f}{V}$$

and the air flow arrives at the flame front after a total time delay of $$\tau_a = \frac{x_a}{c-V} + \frac{x_a}{V}.$$

Referencing everything to the chamber pressure, the flow rates at the flame are then given by $$\dot{m}_f = A_{ef}\sqrt{\frac{2g}{RT_f}P_{sf}(P_{sf} - P_{ave} - P_c\sin(\omega(t-\tau_f)))}\,;$$

and $$\dot{m}_a = A_{ae}\sqrt{\frac{2g}{RT_a}P_{sa}(P_{sa} - P_{ave} - P_c\sin(\omega(t-\tau_a)))}\,.$$

The fuel flow rate divided by the air flow rate at each instant in time then defines the instantaneous fuel/air ratio with respect to the pressure wave in the combustor which is given by $$\frac{f}{a} = \frac{\dot{m}_f}{\dot{m}_a}.$$

This fuel/air ratio represents the fuel concentration fluctuation. The model further assumes that the heat release Q' is proportional to the fuel/air ratio for relatively small fluctuations in the ratio:

$$Q' \propto \frac{f}{a} - \frac{f}{a}\bigg|_{avg}.$$

A combustion delay between the time the fuel concentration wave arrives at the flame front and when the heat release occurs can also be included; this time delay is typically on the order of 0.1–1.0 msec.

To determine the ultimate effect of the fuel concentration wave on the combustor dynamics, Rayleigh's criteria is considered. Thus, a gain factor is calculated as the integral of the fluctuating pressure, P', times the fluctuating heat release, Q':

$$GAIN = \int_0^{\tau} P'Q'\,dt.$$

where T represents one complete period (the reciprocal of the frequency). If this gain is positive, there is a net transfer of thermal energy into mechanical energy or pressure and the pressure oscillation will be enhanced. If the gain is negative, the oscillation will be reduced as a result of the concentration fluctuation. The actual value of the gain is arbitrary. Thus, pressure oscillations can be minimized by minimizing the gain.

The model is applied to the conditions expected for a given combustor to determine the configuration of premixer 28 which provides a fuel concentration wave out-of-phase with the pressure in combustion chamber 26 so as to reduce combustion instabilities. For a given combustion application, the effective areas of fuel injection orifices 40 and swirler 32 are specified and the model is used to determine optimal values for the distances $x_f$ and $x_a$ which these elements are located from where flame 24 is established.

For example, considering a model prediction in which a net gain factor against a distance $x_f$ for a certain combustor has a predetermined distance $x_a$ and exhibits combustion instabilities at frequencies of 50 Hz and 100 Hz. Fuel injection orifices 40 should be positioned a distance from the flame front that would provide relatively low gains for both frequencies and would thus optimize the premixer for both frequencies. The model can also be used in an iterative fashion to determine the optimum values where both $x_f$ and $x_a$ are variable.

In accordance with the present invention, uncoupling the fuel from the combustion may be further enhanced by axially staging the fuel and air mixtures from orifices 40 out of phase with each other for reducing the amplitude of the corresponding fuel concentration waves discharged from premixers 28 for additionally improving dynamic stability of flame 24. By axially spreading out the injected fuel in premixers 28 during operation, the corresponding strength of the developed fuel concentration waves may be significantly reduced, and in the optimum configuration may conceivably result in the various fuel sources canceling out each other resulting in a substantially constant fuel concentration exiting premixers 28, which would therefore be unable to feed or excite the pressure oscillations of combustion flame 24.

The invention may be implemented in various forms. In one embodiment illustrated in FIG. 1, fuel injector 34 preferably includes a plurality of first fuel injection orifices 40*a* disposed in duct 30 of a first one of premixers 28*a* at a common first axial distance $X_1$ upstream from dome 26*b* and duct outlet 30*b*, with duct flow channel 38 being preferably unobstructed therebetween to avoid any undesirable flame holding capability in this region. Fuel injector 34 also includes a plurality of second fuel injection orifices 40*b* disposed in duct 30 of a second premixer 28*b* at a common second axial distance $X_2$ upstream from dome 26*b* and corresponding duct outlet 30*b*, with first and second orifices 40*a* and 40*b* being axially spaced apart from each other at a predetermined axial distance S. Flow channel 38 of second premixer 28*b* is similarly preferably unobstructed from second orifices 40*b* downstream to duct outlet 30*b* for avoiding any flameholding capability in this region.

In this way, axial staging of fuel 22 is effected in the corresponding pair of premixers 28, with respective flow channels 38 of both of first and second premixers 28*a* and 28*b* being unobstructed from respective first and second orifices 40*a* and 40*b* downstream to dome 26*b* for eliminating any flashback concern. Fuel 22 may therefore be discharged from respective first and second orifices 40*a* and 40*b* without limit on percentage of total fuel flow, with an equal flowrate of fuel being desirable for both first and second orifices 40*a* and 40*b*.

As indicated above, the theory of operation teaches that the pressure oscillation of flame 24 at any specific frequency propagates upstream in each of premixers 28 and is correspondingly delayed due to the difference in axial distances $X_1$ and $X_2$. The upstream propagating flame pressure oscillation reaches respective first and second orifices 40*a* and 40*b* and in turn fluctuates the amount of fuel 22 being discharged therefrom for generating corresponding first and second fuel concentration waves, respectively. These two waves oscillate in conjunction with the flame pressure oscillation at the corresponding frequency. By suitably selecting the axial spacing S between first and second orifices 40*a* and 40*b*, first and second fuel concentration waves therefrom may be caused to be out of phase with each other for reducing the collective amplitude thereof as they are discharged concurrently into chamber 26 for in turn reducing the magnitude of the flame pressure oscillation to reduce dynamic pressure instability in chamber 26. In this way, the fuel discharged from premixers 28*a* and 28*b* is uncoupled at least in part from combustion flame 24 to enhance dynamic stability of flame 24 in combustion chamber 26.

In a preferred embodiment, the flame pressure oscillation at a specific frequency of interest such as the fundamental excitation frequency, has a corresponding period, which is simply the inverse of the frequency, and the first and second fuel concentration waves travel downstream through respective premixers 28*a* and 28*b* at a velocity which is generally equal to the average flow velocity of air 20 therethrough. The axial spacing S is preferably selected to be equal to about the product of one half of the period and the flow velocity for effecting 180° out of phase between the first and second fuel concentration waves.

For example, for a flame pressure oscillation frequency of 150 Hz, the corresponding period is 6.6 ms. One half of this period is 3.3 ms. With an exemplary airflow velocity through flow channels 38 of about 150 feet per second, the resulting value for the axial spacing S is about 6 inches. Of course this differential axial spacing S may be effected using various combinations of the individual first and second axial distances $X_1$ and $X_2$. In an exemplary embodiment, the first axial distance $X_1$ may be about 4 inches whereas the second axial distance $X_2$ may be about 10 inches for providing the exemplary 6 inch difference therebetween.

Either one of the first and second axial distances $X_1$ and $X_2$ may be determined for additionally ensuring that at least one of the first and second fuel concentration waves itself is also out of phase with the flame pressure oscillation at the corresponding frequency for providing enhanced stability from the combination thereof. The first and second axial distances $X_1$ and $X_2$ should also be determined in accordance with conventional practice to ensure an effective amount of premixing and pre-vaporization in respective first and second premixers 28*a* and 28*b* without concern for flashback. In a preferred embodiment, fuel injection should occur downstream of the respective swirlers 32 to ensure that swirlers 32 do not provide a flameholding component which could promote flashback into individual premixers 28.

In the exemplary embodiment illustrated in FIG. 1, fuel injector 34 preferably also includes sets of circumferentially spaced apart first and second fuel spokes 42*a* and 42*b* extending radially outwardly from respective centerbodies 36. First orifices 40*a* are disposed in first spokes 42*a* radially spaced apart from each other in each of the spokes, with second orifices 40*b* being similarly disposed in second spokes 42*b* radially spaced apart from each other in each of the spokes. In this way, the fuel is distributed fairly uniformly both radially and circumferentially across the corresponding flow ducts 38 in a conventional manner. But for the axial staging of the fuel at the respective first and second axial distances $X_1$ and $X_2$, premixers 28 may otherwise be conventional. In conventional combustors, the premixers are all typically identical with the corresponding fuel spokes being disposed at the same or identical axial distance from dome 26*b* without regard for the phase relationship between the corresponding fuel concentration waves generated and without regard for the phase of resulting heat release relative to the phase of the combustion flame oscillation at specific frequencies. Conventional fuel spokes are typically identically configured and arranged for maximizing premixing and pre-vaporization to minimize exhaust emissions from the combustion flame.

Accordingly, by providing relatively simple axial staging of the fuel through first and second fuel orifices 40*a* and 40*b*, improved combustor dynamic stability may be obtained while still obtaining low NOx emissions without additional concern for undesirable flashback in the individual premixers 28.

As indicated above, the fuel concentration wave discharged from each of premixers 28 includes both the fuel and the air as components thereof. In the FIG. 1 embodiment illustrated, the fuel itself is being axially staged for effecting the desired corresponding fuel concentration waves. In an alternate embodiment, the fuel is injected at a common axial plane, with axial staging instead being provided by staging the air, which may be accomplished by repositioning swirlers 32 relative to each other. Accordingly, axial staging may be effected by staging at least one of the air and fuel in premixers 28 for enjoying the benefits of the present invention.

Figure 2:
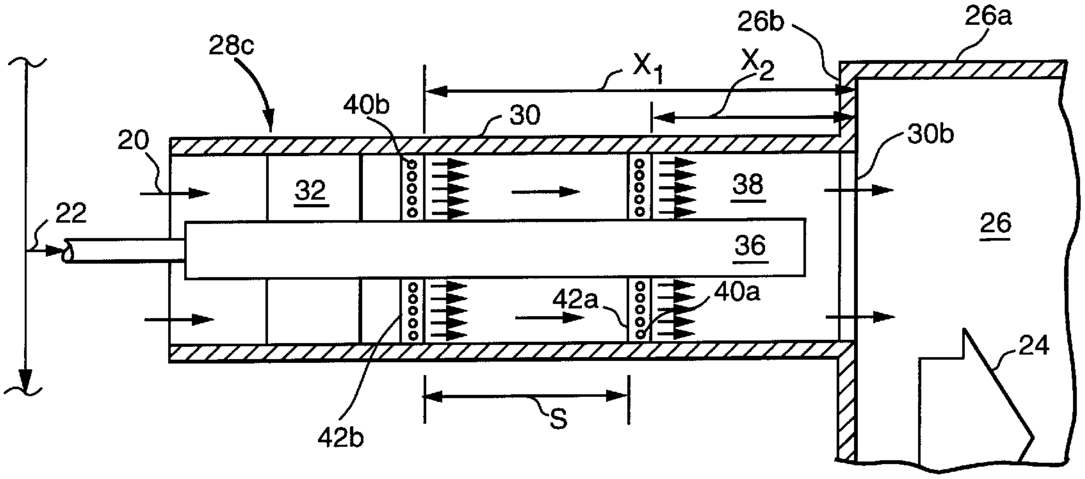
FIG. 2 is a partly sectional, elevational view of a portion of a combustor including a premixer in accordance with a second embodiment of the present invention.

Illustrated schematically in FIG. 2 is another embodiment of the present invention wherein axial fuel staging is effected in each or a common third one of the premixers designated 28*c*. In this embodiment, each of third premixers 28*c* are identical to each other and discharge the fuel and air mixtures into common combustion chamber 26. This embodiment may be substantially identical to the embodiment illustrated in FIG. 1 except that first and second fuel spokes 42*a* and 42*b* and the corresponding first and second fuel injection orifices 40*a* and 40*b* are disposed together in the same flow channel 38 for discharging the fuel at two axially spaced apart planes therein identified by the corresponding first and second axial distances $X_1$ and $X_2$, with the axial differential spacing S therebetween.

In this embodiment, second spoke 42*b* and second orifices 40*b* therein are disposed axially between swirler 32 and first spokes 42*a* having first orifices 40*a* therein. With third premixer 28*c* having the same operating conditions as first and second premixers 28*a* and 28*b* described above, the same axial distances may be used, i.e. the first axial distance $X_1$ is about 4 inches, the second axial distance $X_2$ is about 10 inches, and the axial spacing S therebetween is about 6 inches for attenuating combustion flame oscillation at the exemplary 150 Hz frequency.

First orifices 40*a* effect the first fuel concentration wave propagating downstream therefrom, and second orifices 40*b* effect the second fuel concentration wave propagating downstream therefrom, which second wave mixes with the first concentration wave, with the two waves effecting a combined fuel concentration wave which is discharged into combustion chamber 26 to undergo combustion therein. As indicated above, first and second orifices 40*a* and 40*b* may be staged relative to each other at the axial spacing S so that the corresponding first and second waves are out of phase with respect to each other, with the resulting combined fuel concentration wave generated thereby having substantially reduced pressure fluctuation and being more nearly constant in magnitude. To the extent the combined fuel concentration wave may still effect a periodic fluctuation, either the first or second axial distance $X_1$ or $X_2$ may also be to ensure that the heat release from the combined fuel concentration wave is also out of phase with the flame pressure oscillation for further reducing dynamic pressure in flame 24 at the corresponding single frequency.

In this embodiment, however, first fuel spokes 42*a* are disposed between second fuel spokes 42*b* and duct outlet 30*b* and therefore provide a structure capable of flameholding. Accordingly, the second axial distance $X_2$ should be suitably selected to ensure that the pre-vaporization of the fuel downstream from second fuel spokes 42*b* does not undesirably approach the auto-ignition temperature which could cause flashback of flame 24 upstream in duct 30 with flameholding at first fuel spokes 42*a*. Such flashback would damage the premixer, and therefore a suitable flashback margin should be maintained by limiting the second axial distance $X_2$, or limiting the percentage flow of fuel to upstream second fuel orifices 42*b* to provide a leaner fuel concentration wave downstream therefrom.

Although two different axial planes for axially staging fuel injection are disclosed above, additional planes of axial fuel staging may be used in accordance with the present invention for attenuating or suppressing multiple combustion dynamic frequencies. However, each of fuel spokes 42*a* and 42*b* used for introducing a respective plane of fuel injection effects an undesirable pressure drop and causes flow obstruction in respective flow channels 38 which is undesirable for the reasons presented above.

Figure 3:
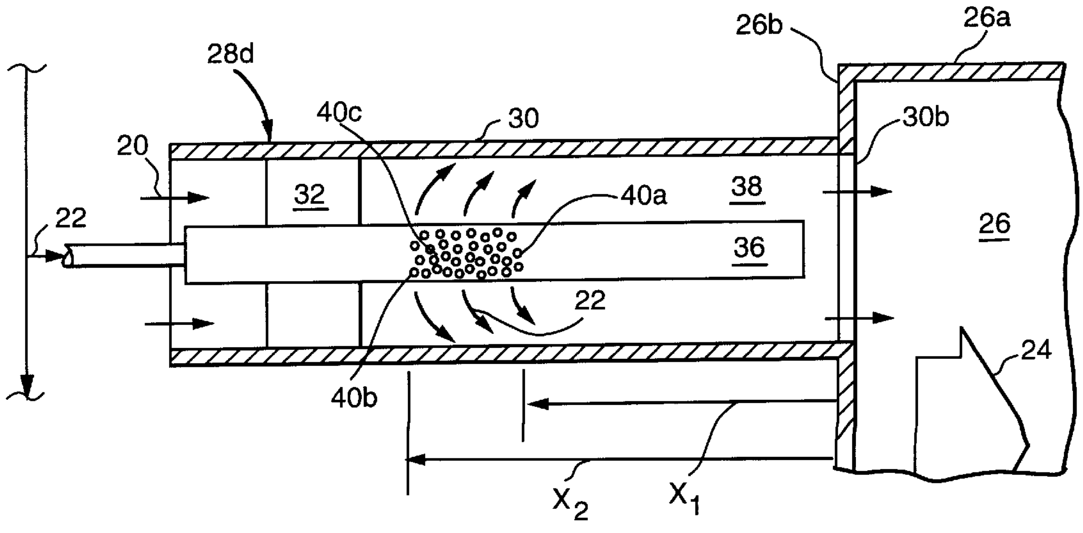
FIG. 3 is a partly sectional, elevational view of a portion of a combustor having a premixer in accordance with a third embodiment of the present invention.

Accordingly, illustrated in FIG. 3 is a third embodiment of the present invention having an exemplary fourth premixer 28*d* which is otherwise identical to the previous premixers except that no fuel spokes are used, and instead first and second fuel injection orifices 40*a* and 40*b* are disposed flush in the outer surface of centerbody 36 in each of the premixers in common flow channels 38 for providing unobstructed flow to combustion chamber 26. In this way, axial fuel staging may be effected at multiple axial locations with multiple fuel concentration waves being generated therefrom for reducing the dynamic pressure of combustion flame 24 at a plurality of different frequencies.

Centerbody 36 in this embodiment may include additional or third fuel injection orifices 40*c* disposed at various axial planes between first and second orifices 40*a* and 40*b* for axially and circumferentially distributing fuel 22 into flow channel 38 for concurrently reducing the dynamic pressure amplitude at multiple flame pressure oscillation frequencies. Fuel 22 may be distributed radially from centerbody 36 outwardly toward the inner surface of duct 30 by suitably varying the fuel jet velocity and momentum such that the fuel jets discharged from various orifices 40*a*, 40*b*, and 40*c* penetrate flow channel 38 to various radial positions within the fluid stream flowing therethrough. As shown in FIG. 3, orifices 40*a–c* may increase in diameter in centerbody 36 in the downstream direction so that upstream orifices 40*b* inject fuel 22 to the radially least extent, with radial penetration increasing for the increasingly sized orifices downstream to first orifices 40*a* having the largest diameter. The orifice pattern and diameter may be changed as desired.

This method of spreading the fuel injection among many axial positions has an advantage over the method of placing the fuel injectors at specific positions to create the out of phase fuel concentration waves as described above. A single plane of fuel injection can be specifically positioned for attenuating a specific oscillation frequency of combustion flame 24 as described above. A single plane of fuel injection may also attenuate multiple frequencies if they are suitably close together so that the fuel concentration waves are out of phase at least in part with each of those frequencies. The use of two axial fuel injection planes may more effectively attenuate one or more oscillation frequencies. The use of discrete axial injection planes is limited by practical concerns as indicated above and therefore may not be effective for attenuating all harmonic frequencies of interest.

However, the embodiment illustrated in FIG. 3 provides a practical solution for injecting the fuel at multiple axial planes without obstruction of flow channel 38, and is therefore more capable of attenuating a greater range of harmonic frequencies of oscillation of flame 24 during operation. Axially spreading the fuel injection in this manner can also be useful for creating fuel concentration waves that are out of phase with the flame dynamic pressure by increasing the bandwidth of effectiveness.

The various embodiments disclosed above provide relatively simple and practical means for introducing axial fuel injection at specific axial positions within premixers 28 for attenuating the amplitude variation of the fuel concentration waves discharged from the premixers to improve combustor stability. And, the fuel concentration waves may also be discharged into combustion chamber 26 to ensure that the heat release therefrom is out of phase with the combustion flame for further attenuating the dynamic response thereof.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

What is claimed is:

1. A method for dynamically stabilizing combustion in a combustion comprising the steps of:

mixing fuel and air in at least two premixers to form a fuel air mixture;

injecting fuel through a fuel injector having a plurality of fuel injection orifices axially spaced apart from each other within a first premixer at a first axial position;

injecting fuel through a second fuel injector having a plurality of fuel injection orifices axially spaced apart from each other within a second premixer at a varied axial position with respect to said first premixer;

discharging said mixtures into said combustion chamber;

combusting said mixtures in said combustion chamber to form a flame excitable at a pressure oscillation propagating upstream into said premixers to cause said mixtures to oscillate as fuel concentration waves so that said corresponding fuel concentration waves are out of phase with each other for uncoupling fuel from combustion to reduce the magnitude of said flame pressure oscillation and dynamic pressure instability in said combustion chamber.

* * * * *